(12) United States Patent
Plant

(10) Patent No.: US 12,180,366 B2
(45) Date of Patent: Dec. 31, 2024

(54) ENERGY ABSORBING MATERIAL

(71) Applicant: RHEON LABS LTD, London (GB)

(72) Inventor: Daniel James Plant, London (GB)

(73) Assignee: RHEON LABS LTD, London (GB)

( * ) Notice: Subject to any disclaimer, the term of this patent is extended or adjusted under 35 U.S.C. 154(b) by 821 days.

(21) Appl. No.: 17/198,540

(22) Filed: Mar. 11, 2021

(65) Prior Publication Data

US 2021/0198485 A1 Jul. 1, 2021

Related U.S. Application Data

(63) Continuation of application No. PCT/EP2019/074278, filed on Sep. 11, 2019.

(30) Foreign Application Priority Data

Sep. 11, 2018 (GB) .................................. 1814816

(51) Int. Cl.

| | |
|---|---|
| *C08L 75/04* | (2006.01) |
| *A41D 19/015* | (2006.01) |
| *A41D 31/18* | (2019.01) |
| *A41D 31/28* | (2019.01) |
| *C08L 83/08* | (2006.01) |
| *D01F 8/16* | (2006.01) |

(52) U.S. Cl.
CPC ........ *C08L 75/04* (2013.01); *A41D 19/01523* (2013.01); *A41D 31/18* (2019.02); *A41D 31/28* (2019.02); *D01F 8/16* (2013.01); *C08L 83/08* (2013.01); *C08L 2207/04* (2013.01); *C08L 2310/00* (2013.01); *C08L 2312/06* (2013.01)

(58) Field of Classification Search
CPC ...... C08L 75/04; C08L 83/08; C08L 2207/04; C08L 2310/00; C08L 2312/06; A41D 19/01523; A41D 31/18; A41D 31/28; D01F 8/16

See application file for complete search history.

(56) References Cited

U.S. PATENT DOCUMENTS

| | | | |
|---|---|---|---|
| 7,381,460 B2 | 6/2008 | Palmer et al. | |
| 8,387,170 B2 | 3/2013 | Green et al. | |
| 2015/0126631 A1 | 5/2015 | Bruno et al. | |
| 2016/0016341 A1 | 1/2016 | Lai et al. | |

OTHER PUBLICATIONS

International Search Report and Written Opinion dated Dec. 13, 2019 for Application No. PCT/EP2019/074278.

*Primary Examiner* — Ling Siu Cho
*Assistant Examiner* — Andrea Wu
(74) *Attorney, Agent, or Firm* — Dinsmore & Shohl LLP

(57) ABSTRACT

A composition comprising a liquid-castable polymer system combined with solid particles of a shear thickening additive; an energy absorbing material formed from the composition; and an article comprising the energy absorbing material on a substrate, for example, a glove (1) including the material of the present disclosure as energy absorbing elements (2a, 2b, 2c, 3a, 3b, 3c, 3d, 3e) incorporated onto the surface (4) of a textile substrate to provide protection over the metacarpophalangeal and proximal interphalangeal joints.

25 Claims, 1 Drawing Sheet

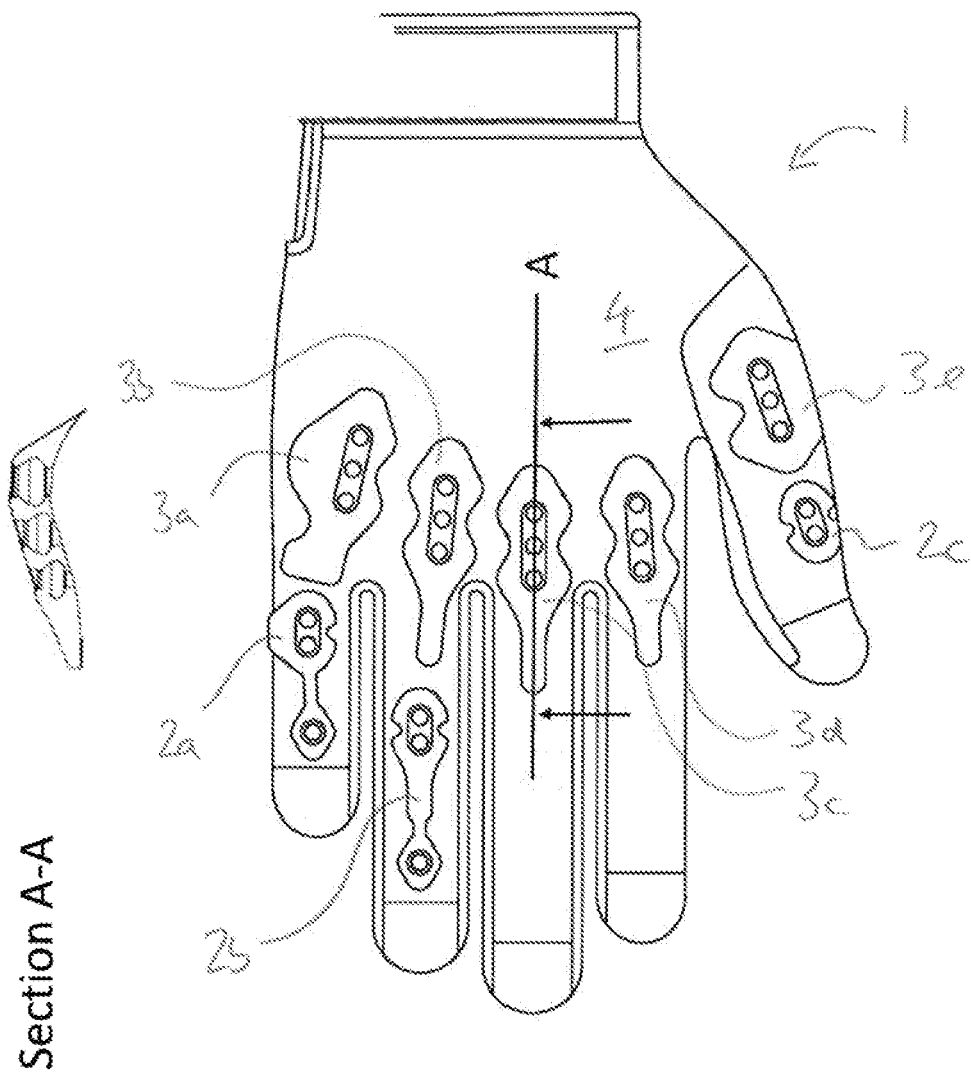

ENERGY ABSORBING MATERIAL

CROSS-REFERENCE TO RELATED APPLICATIONS

This application is a continuation of and claims priority to PCT International Patent Application No. PCT/EP2019/074278, filed Sep. 11, 2019, which claims priority to UK Patent Application No. 1814816.3, filed Sep. 11, 2018, and each of the above-referenced patent applications is hereby incorporated by reference herein in its entirety.

INTRODUCTION

There is a need for an energy absorbing material with improved performance that can be integrated into low cost tooling and manufacture, that is cast onto protective items and incorporated into clothing, such as gloves, body close garments, and footwear insoles and uppers. Existing protection in the form of hard shells have low flexibility and soft shells based on foams do not offer the needed protection, especially when below 6 mm in thickness.

Active materials, or strain rate sensitive materials that have energy control and damping for impact have been disclosed in WO2010/076257, which describes an active material is either combined with a geometry or a tensile layer (textile layer), and integrated in to clothing. The strain rate material as described in this disclosure as dilatant (that is a shear thickening material), which can be blended with a second material, typically a thermoplastic elastomer (TPE), before application of the geometry or tensile layer, e.g. a textile layer. These materials when combined with geometry or a tensile layer give high energy absorbing properties in thin sections.

Typically, these compositions are provided in granular form and are injection molded into complex shapes, in hard steel/expensive injection mold tooling. If items of clothing are being made in different designs and sizes, then tooling cost increases dramatically. By way of example, an article of clothing for body close protection, with only a few designs might be made in five sizes, in left and right orientations, as well as gender specific versions. So for a clothing range you could be looking at a dozen or more tools. The same would be true for helmet liners, where small, medium, large and XL would be needed. Similarly, gloves with protection would be needed in 7 sizes, as well as left and right hand versions for each design; and footwear uppers could need a dozen or more tools to cover the size range.

As well as providing improved energy control materials that can be used in low cost tooling, there is a need also to improve the locality of the application of the energy absorbing material. Thus, there is a need for a low cost tooling, which can be integrated into clothing production locally, for body close protection, helmet liners, boots, shoes and gloves and so on. All of these examples require complex tooling in many sizes.

Liquid-castable polymer systems are well known and readily commercially available. Information on the Shore D hardness of the solidified polymer matrix formed from a liquid-castable polymer system is published by suppliers, enabling the skilled person to select a liquid-castable polymer system that produces a solidified material with given hardness.

Liquid casting rubbers, as well as polyurethanes (PU) have previously been used in low pressure tooling applications, and some lower level energy absorbing products have been created by such techniques. These materials are typically two part systems, where the resin is mixed, and poured into a low cost tool and degassed as needed. Often then a tensile layer or textile is applied, the parts allowed to cure and the parts peeled out of the tool. This is often done for impact gloves or footwear uppers, in simple one sided tools, machined with great detail into softer metals such as aluminum, brass, particle board or polymer 3-D printed. The parts can be adhered to the textile in tool, in the same process. The tooling cost is often a factor of ten times less than that of an injection mold tool in hardened steel.

A similar process is used for shoe uppers, and boots, where the liquid casting rubber or TPU is again applied in a soft one sided tool with a textile applied to the part before cure and release.

BRIEF SUMMARY

The present inventors have come to the realization that a low pressure tooling application could be used to create energy absorbing materials and articles incorporating such materials with improved performance that can be integrated into low cost tooling and manufacture. For example, materials that can be cast onto protective items and incorporated into clothing, such as gloves, body close garments, footwear uppers, insoles, back protectors, cycling seats and grips.

An advantage of such an approach is that these low pressure tooling solutions are already used, and so there is less disruption in the supply chain, such as moving textiles between injection molding and stitching facilities. There is also low pressure on the textiles, and designs can be places on larger pieces of fabric with more stretch, in a number of locations using a low pressure tooling solution. For example, a close fitting circular knitted shirt could have 5 zones protected on one garment (elbows, shoulders, back). This disclosure outlines a methodology of improving the performance of these two-part resin systems for energy control and impact performance, by the addition of highly energy absorbing material.

The composition of the present disclosure comprises: a liquid-castable polymer system, combined with a shear thickening additive, in the form of solid particles, optionally selected from (i) a dilatant, (ii) a silicone master batch, and (iii) a TPE/silicone blend.

The inventors have found that if solid particles of (B) a shear thickening additive are mixed into (A) a liquid-castable polymer system, a material can be formed on solidification, e.g. by cast molding, that is soft and flexible, having hardness properties dominated by the elastomeric polymer produced from casting the liquid-castable polymer system (e.g. a Shore D hardness in the range of about 30 to 60), coupled with advantageous energy absorbing properties.

The liquid-castable polymer system (A) is a castable liquid, which solidifies to form a solid elastomeric polymer material. The solidification typically involves curing of the liquid-castable polymer system (A) in which the components of the system react together, for example, in a cross-linking or polymerization reaction, to form an elastomeric polymer matrix. The solid elastomeric polymer material typically has a Shore D hardness in the range of 30 to 60.

The shear thickening additive (B) is preferably in the form of solid particles, i.e. particles which are solid at room temperature (25° C.). The particles preferably have a D10 of at least 0.05 mm and a D90 of no more than 2.0 mm. The shear thickening additives are solid particles typically having a maximum number average dimension of about 1 mm, preferably a D50 (mass median diameter) of less than 1.0 mm, for example, of from 0.20 mm to 1.0 mm.

The composition of the present disclosure is preferably a liquid at 25° C., which solidifies to form a solid material on curing. Alternatively, the composition may be a low melting point solid, e.g. solid at 25° C. with a melting point of less than 200° C., preferably less than 150° C., such as less than 120° C., for example less than 100° C., especially less than 80° C. The composition preferably has a viscosity in the range of from 200 to 10,000 cSt at the casting temperature. The casting temperature is typically in the range of from 25 to 200° C., preferably about 25° C.

In a preferred aspect, the present disclosure provides a composition comprising: a liquid-castable polymer system, which solidifies to form a material comprising an elastomeric polymer matrix, the material having a Shore D hardness in the range of 30 to 60; combined with a shear thickening additive, in the form of solid particles, having a D10 of at least 0.05 mm and a D90 of no more than 2.0 mm and a Shore D hardness of at least 30.

The system may optionally be a two-pack system comprising two or more liquids which, when mixed, cure to form a solid material.

The composition of the present disclosure, and also the material of the present disclosure (i.e. the material obtained or obtainable from the composition of the present disclosure), preferably includes at least 5% wt % of the shear thickening additive (B), advantageously at least 10 wt %, such as at least 15 wt % of the shear thickening additive (B), for example at least 20 wt % of the shear thickening additive (B), especially at least 25 wt % of the shear thickening additive (B). The composition and material of the present disclosure may include from 10 to 50 wt % of the shear thickening additive (B), such as from 15 to 45 wt % of the shear thickening additive (B), especially from 20 to 40 wt % of the shear thickening additive (B), preferably from 25 to 40 wt % of the shear thickening additive (B). The incorporation of about 30 wt % of the shear thickening additive (B) into the a liquid-castable polymer system (A) has been found to be particularly advantageous in lessening the amount of force transmitted by a solidified material formed from the composition of the present disclosure. It has been found that including the shear thickening additive (B) in both components of a two pack system enables substantial amounts of the shear thickening additive (B) to be incorporated into a composition of the present disclosure, for example, amounts of 15 wt % or more, based on the total weight of the composition.

The composition of the present disclosure typically includes from 40 to 90% by weight of the liquid-castable polymer system (A), for example from 45 to 80 wt %, especially from 55 to 70 wt % of the liquid-castable polymer system (A).

Also provided is a solid elastomeric polymer material produced by solidification of the composition of the present disclosure, for example, an energy absorbing material comprising: (a) a solid elastomeric polymer and (B) a shear thickening additive in the form of solid particles having a D10 of at least 0.05 mm and a D90 of no more than 2.0 mm, the material having a Shore D hardness in the range of from 30 to 60. Preferably solidification involves cast-molding the composition to form the solid material. The term "solid" refers to materials, which are self-supporting at 25° C. The solid elastomeric polymer is typically in the form of a cross-linked polymer matrix.

The solid material typically has a density of at least 100 kg/m$^3$, preferably at least 250 kg/m$^3$, especially at least 400 kg/m$^3$.

The solid material typically has a thickness of no more than 14 mm, preferably no more than 8 mm.

In the composition of the present disclosure, the liquid-castable polymer system (A) is combined with (B) solid particles of a shear thickening additive (also known as a filler). The shear thickening additive (B) is incorporated into the liquid-castable polymer system (A) prior to solidification. The shear thickening additive (B) may be mixed into the liquid-castable polymer system (A) after the liquid-castable polymer system (A) has been formed, i.e. after the mixing of the components of the liquid-castable polymer system (A) but before solidification is complete. Alternatively the shear thickening additive (B) may be mixed into the individual components of the liquid-castable polymer system (A) prior to the components of the liquid-castable polymer system (A) being combined, for example the shear thickening additive (B) may be added to one component of a two-pack system or both components of a two-pack system which forms the liquid-castable polymer system (A) when the two components are combined.

Also provided is an article of the present disclosure incorporating the material of the present disclosure. The article of the present disclosure may include a substrate, for example, in the form of a sheet or film of material, preferably a flexible sheet of material. It has been found that the material of the present disclosure can be applied to a wide variety of substrates, e.g. by casting. Advantageously the material can be directly bonded to the substrate. It has been found that the material can be directly bonded to the substrate without a separate attachment means, for example, without the need for stitching or an adhesive layer to attach the material to the substrate. It has been found that casting the material in contact with the substrate allows the material to be directly bonded to the substrate. The substrate may be textile (e.g. a knitted textile, woven textile, braided textile or a non-woven fabric), a polymer film or sheet (including vinyl, polyvinyl chloride, polyester, polyethylene, polyurethane, polycarbonate and aromatic polyamide) or leather. The substrate may be a composite material, e.g. comprising multiple laminated films. The material of the present disclosure is optionally present on the surface of the substrate (e.g. textile substrate), for example as a surface layer, and/or distributed through or into the substrate (e.g. a textile). A substrate that is porous to the composition from which the material is formed, such as a woven or knitted fabric, has been found to facilitate distribution of the material through or into the substrate. The textile is preferably a fabric, especially a woven or knitted fabric. The article of the present disclosure may be in the form of, or a component of, an article of clothing, especially an article of protective clothing that protects the wearer from impact, for example, a vest, jacket, helmet liner, article of footwear (e.g. boot or shoe) or a glove. In one embodiment, the article may be a glove. The energy absorbing material is preferably included in an article of clothing as a protective element, e.g. as a cushioning element.

In one aspect the present disclosure provides an article, especially an article of clothing, comprising: an energy absorbing material as described herein, e.g. as a protective element on the article of clothing, and a substrate as described herein, especially a flexible sheet. The energy absorbing material advantageously comprising: (a) a solid elastomeric polymer and (B) a shear thickening additive in the form of solid particles having a D10 of at least 0.05 mm and a D90 of no more than 2.0 mm, the material having a Shore D hardness in the range of from 30 to 60. Advantageously the energy absorbing material is directly bonded to the substrate.

The material of the present disclosure may be prepared in a process in which the composition of the present disclosure is prepared, placed in a mold and solidified. Solidification of the composition may occur spontaneously, for example due to a chemical reaction that cures the liquid-castable polymer system (A) once formed. The solidification step may involve an additional initiation step, for example, involving the application of heat and/or radiation, especially actinic radiation e.g. UV radiation. The solidification step may involve a crosslinking reaction or a polymerization reaction.

The process may involve combining two components of the liquid-castable polymer system (A), for example, mixing together two liquid components. A curing reaction may proceed spontaneously following preparation of the liquid-castable polymer system (A), for example following mixing of two components, or following an initiation step. The process may comprise the step of incorporating the shear thickening additive (B) into the liquid-castable polymer system (A) after the liquid-castable polymer system (A) has been formed or may comprise the step of combining the shear thickening additive (B) into one or more components of the liquid-castable polymer system (A) prior to the combination of all the components of the liquid-castable polymer system (A) to form the complete liquid-castable polymer system (A). Preferably, the solidification step does not commence prior to the incorporation of the shear thickening additive (B) into the liquid-castable polymer system (A). In one embodiment, an initiator that initiates curing of the liquid-castable polymer system (A) is included in a composition also comprising the shear thickening additive (B), such that the liquid-castable polymer system (A) is completed on mixing of the composition comprising the shear thickening additive (B) and the initiator with the other components of the liquid-castable polymer system (A). As such, curing of the liquid-castable polymer system (A) does not commence until the shear thickening additive (B) is included into the composition.

Curing preferably takes place in a mold at ambient pressure. Curing is advantageously carried out without any applied pressure. Curing is optionally carried out at a pressure of less than 200 kPa, especially less than 120 kPa. Curing preferably takes place at a pressure of at least 50 kPa, especially at least 80 kPa, i.e. a pressure of about atmospheric pressure (approximately 101 kPa). The curing may take place in an open mold, i.e. a mold that is not fully sealed. The casting may be carried out in single part molds, 2-part molds (e.g. comprising male and female mold halves) or a multipart mold. The molding process may be a reaction injection molding (RIM) process in which two or more components of the liquid-castable polymer system (A) are injected into the mold and reacted within the mold. The two or more components may be separately injected into the mold.

The materials of the present disclosure typically have a Shore D hardness in the range of 30 to 60. If has been found that the hardness of the material typically approximately matches that of the elastomeric polymer produced from the liquid-castable polymer system. The addition of the particles of shear thickening additives (e.g. in an amount of less than 60 wt %) has been found to not materially alter the hardness of the elastomeric polymer produced from the liquid-castable polymer system.

An article of the present disclosure preferably includes a substrate (e.g. a textile substrate) and the material of the present disclosure. The material of the present disclosure is advantageously formed when in contact with the substrate (e.g. the textile). For example, the article of the present disclosure may be formed by solidifying a composition of the present disclosure while on contact with a substrate (e.g. a textile). An article of the present disclosure that comprises a substrate (e.g. a textile) may be prepared in a process in which the composition of the present disclosure is placed in a mold, together with the substrate (e.g. a textile), and the composition is then solidified, or continues solidifying, in the mold while on contact with the substrate (e.g. a textile). The solidification step may involve an initiation step, for example involving the application of heat and/or radiation, e.g. UV radiation, after the composition has been placed in contact with the substrate (e.g. a textile). During solidification the liquid composition advantageously penetrates into the substrate (e.g. into a textile). The solid material in the article of the invitation advantageously penetrates the substrate (e.g. a textile).

The term "solid" as used herein refers to dimensionally stable materials that do not change dimensions under ambient conditions (e.g. at room temperature and pressure). The solid material of the present disclosure is self-supporting and does not deform under its own weight. The solid material typically exhibits plasticity and is optionally ductile undergoing plastic deformation on tensile stress without rupture, malleable, undergoing plastic deformation under compressive stress. The solid material may be elastically deformable.

BRIEF DESCRIPTION OF THE DRAWINGS

FIG. 1 shows an article according to one embodiment of the present disclosure.

DETAILED DESCRIPTION

Liquid Castable Polymer System—Part A

Component (A) the liquid castable polymer system advantageously produces a elastomeric polymer having a Shore D hardness in the range of from 5 to 80, preferably from 30 to 80, especially from 30 to 60, such as from 40 to 60 once cast. Shore D hardness is measured according to the ASTM D2240-00 testing standard. As noted above, liquid-castable polymer systems are well known and readily commercially available. Information on the Shore D hardness of the solidified polymer formed from a liquid-castable polymer systems is widely known, e.g. being published by suppliers, enabling the skilled person to select a liquid-castable polymer system that produces a solidified material with given hardness. If the hardness is not published, it is straightforward to cast the polymer system and measure the hardness of the cast material.

The liquid castable polymer system produces an elastomeric polymer material on casting. Again it is well known whether castable compositions produce elastomeric polymers and the elongation of the polymer produced from a liquid castable polymer system can be readily determined. Advantageously, component (A) additionally or alternatively is castable into an elastomeric polymer material having an elongation to break of over 100%.

The liquid-castable polymer system is preferably liquid at room temperature (25° C.). Alternatively the liquid-castable polymer system may be a low melting point solid, e.g. solid at 25° C. with a melting point of less than 200° C., preferably less than 150° C., such as less than 120° C., for example less than 100° C., especially less than 80° C. Such systems can be cast at elevated temperature at which the composition is a liquid. The liquid-castable polymer system preferably has a viscosity in the range of from 200 to 10,000 cSt at the casting temperature. The casting temperature is typically in the range of from 25 to 200° C., preferably about 25° C.

Examples of suitable materials include the groups of: liquid casting rubbers, elastomeric polyurethanes (PU), liquid castable polyurethanes, elastomers based on olefins, silicone rubbers. The elastomeric polymer materials may be multipart systems, e.g., systems including two or more parts (i.e. a two-pack system), including polyurethane and silicone systems. The multiple parts may be combined as a blend. Typical resin systems for liquid casting rubbers are plentiful, in this disclosure for these experiments a polyurethane system was selected. This is described as a 'Liquid Casting Rubber' in the Polyurethanes rubbers (PU) selection supplied by MB fiber glass (UK) and sold under the catalogue number "Polyteck Poly PT flex 50", with a reported Shore D hardness once cast of 50.

Shear Thickening Additives—Part B

The shear thickening additive (B) is a material which, in isolation, exhibits shear thickening behavior. The term "shear thickening" refers to a non-Newtonian fluid (at 25° C.) where the shear viscosity increases with applied shear stress, the shear modulus typically doubling as shear increases from 1 to 10 Hz. The shear thickening additive is preferably in the form of the form of solid particles, i.e. particles which are solid at room temperature (25° C.).

The particles preferably have a D10 of at least 0.05 mm and a D90 of no more than 2.0 mm. The term "solid" refers to a self-supporting material preferably with a Shore D hardness of at least 30. The solid particles may be produced by grinding and sieving to provide particles with the specified particle size distribution.

The shear thickening additive, is optionally selected from (i) a dilatant, (ii) a silicone master batch, and (ii) a thermoplastic elastomer (TPE)/silicone blend. The shear thickening additive is preferably both a dilatant and a silicone master batch, or both a dilatant and a thermoplastic elastomer (TPE)/silicone blend. The shear thickening additive may be a liquid at room temperature (25° C.). For example, the shear thickening additive is a dilatant, which is a liquid at 25° C. The shear thickening additive may have a kinematic viscosity of 5000 cSt ($10^{-6}$ m$^2$/s) or more. For example, the shear thickening additive is a dilatant which is a liquid having a viscosity of 5000 cSt ($10^{-6}$ m$^2$/s) or more at 25° C. The shear thickening additive may be a solid at 25° C., for example, (2) a silicone master batch or (3) a thermoplastic elastomer (TPE)/silicone blend, which is solid at 25° C.

The shear thickening additive preferably exhibits dilatant properties. A dilatant is a non-Newtonian fluid (at 25° C.) where the shear viscosity increases with applied shear stress. Viscosity of a solution as a function of shear rate is given via the Power Law equation:

$$\eta = K\dot{\gamma}^{n-1}$$

where $\eta$ is the viscosity, K is a material-based constant, and $\dot{\gamma}$ is the applied shear rate. Dilatant behavior occurs when n is greater than 1.

Dilatants are liquids in that they are not dimensionally stable and flow under their own weight under ambient conditions but become viscous (e.g. solid-like) under the application of shear. Preferred shear thickening additives (i) (ii) and (iii) are as follows: i) The shear thickening additive is, in one aspect of the present disclosure, a dilatant. Dilatants are well known and described in numerous patents such as WO2010076257. The dilatant may be a borated silicone, such as a polyborodimethylsiloxane (PBDMS).

An example of a suitable dilatant is X3180, a PBDMS mentioned in US201100390087A1, but any borated silicone polymer could be used. Previous patents mention 3179 from Dow Corning, but any materials having dilatant properties could be used. These are often PBDMS sometimes with some fillers. The dilatant and can be obtained, for example, by the method of production described in Japanese Published (Kokoku) Patent Application No. Sho 26-006944 [6,944/1951]. In specific terms, a silicone bouncing putty can be obtained by polymerizing 10 to 90 parts (=weight parts here and below) dimethylsiloxane having alkoxy at both terminals and a viscosity at 25° C. of 1 to 1,000 centistokes (cSt) with 90 to 10 parts dimethylsiloxane having hydroxyl at both terminals and a viscosity at 25° C. of 1 to 10,000 cSt, 0.1 to 15 parts boric acid, and 0 to 20 parts colloidal silica, for example, for 2 to 10 hours at 140-150° C. in a kneader, during this process the material may be blended with other fillers and materials.

Examples of suitable materials were prepared using materials similar to that named "dilatant compound" sold under the category number 3179 from Dow Corning. A grade was developed called X3180 was made as mentioned in US201100390087A1. Its composition and structure are similar to X3179, with the fillers and lubricants removed, these included the removal the colorant (coral), glycerine and silica. The silica additive may be is a filler, which can add the dilatancy in high ratios.

This gave a material that would flow under its own weight, like a fluid, but shear stiffened upon impact such that it would shatter. In this case this ingredient is often called polyborodymethilessiloxane often known as PBDMS, or often referred to as dilatant compound.

This disclosure would include any future materials that exhibit these mechanical properties to be used in part B. To mechanically quantity these materials they can be tested on a shear Rheometer.

These materials can be tested on a Texas Instruments shear rheometer at 25° C. Advantageously, the dilatant has an increase of Shear Modulus from 20 to 1000 (kPa s), as the frequency increases from 0.1-10 Hz.

ii) In another aspect, the shear thickening additive is a silicone masterbatch. A silicone masterbatch is a blend of at least one siloxane polymer and at least one further non-siloxane polymer.

The silicone masterbatch advantageously includes from 10 to 75% by weight siloxane polymer, preferably at least 30% by weight siloxane polymer, especially at least 40% by weight siloxane polymer, such as from 50 to 70% by weight siloxane polymer. The siloxane polymer is advantageously an ultrahigh molecular weight (UHMW) siloxane having a number average molecular weight Mn of at least 100000. The siloxane polymer is blended with, for example, dispersed in dispersed in a further non-siloxane polymer. The non-siloxane polymer is preferably a polyolefin. The polyolefin may be a copolymer or a homopolymer. The non-siloxane polymer is preferably a polymer or copolymer of a $C_2$-$C_8$ alkene, preferably a $C_2$-$C_8$ alpha olefin. The $C_2$-$C_8$ alkene may be linear to branched, preferably linear. Examples of suitable $C_2$-$C_8$ alkenes are ethylene, butylene, propylene and butylene. The non-siloxane polymer may be an ethylene, butylene, propylene and butylene homopolymer, or a copolymer of two or more of ethylene, butylene, propylene and butylene. The non-siloxane polymer may be a copolymer of a $C_2$-$C_8$ alkene and a further unsaturated comonomer, such as vinyl acetate. Examples of suitable non-siloxane polymers include polypropylene homopolymer and ethylene vinyl acetate (EVA).

The silicone masterbatch is preferably in the form of a powder having a D50 (mass median diameter) of from 0.05 to 1.50 mm, for example 0.05 to 0.90 mm and preferably 0.20 mm to 0.80 mm. Preferably at least 99% by weight of the silicone master batch passes through a sieve with openings of 1.2 mm in diameter, preferably 0.95 mm in diameter.

In preparation of the examples, granules were ground down to between 0.05 and 0.90 mm, and sieved through a sieve of 0.95 diameter, to remove any larger particles. Particle size was checked on a high power USB microscope. There are many silicone master batches available, but MB50 from Dow Corning was used in these examples. MB50 Masterbatch is a pelletized formulation containing 50% of an ultra-high molecular weight (UHMW) siloxane polymer dispersed in Ethylene Vinyl Acetate (EVA) homopolymer. Other master batches could be used, and one based on TPE or TPU would be further beneficial.

iii) In another aspect, the shear thickening additive is a thermoplastic elastomer (TPE)/silicone polymer blend. The TPE/silicone blend contains at least one siloxane polymer and at least one further non-siloxane polymer.

The silicone blend advantageously includes from 10 to 75% by weight siloxane polymer, preferably at least 50% by weight siloxane polymer, for example at least 18% siloxane polymer, especially at least 40% by weight siloxane polymer, such as from 50 to 70% by weight siloxane polymer. The siloxane polymer is advantageously an ultra-high molecular weight (UHMW) siloxane having a number average molecular weight Mn of at least 100000. The siloxane polymer is blended with, for example, dispersed in dispersed in a further non-siloxane polymer.

The TPE/silicone blend may comprise a mixture of an organic thermoplastic elastomer having a hardness below 80 shore A measured at 23° C. (ISO 868); and a non-crosslinked and substantially non-reactive silicone polymer, for example as described in WO2012171911A1.

The non-siloxane polymer is preferably a polyolefin. All types of organic thermoplastic elastomer with the respective hardness value can be used. For instance, component (A) can be chosen from the thermoplastic materials cited in Norme ISO 18604:2003, for instance polyamide thermoplastic elastomers, comprising a block copolymer of alternating hard and soft segments with amide chemical linkages in the hard blocks and ether and/or ester linkages in the soft blocks, copolyester thermoplastic elastomers where the linkages in the main chain between the hard and soft segments are chemical linkages being ester and/or ether, olefinic thermoplastic elastomers consisting of a blend of polyolefin and conventional rubber, the rubber phase having little or no cross-linking, styrenic thermoplastic elastomers consisting of at least a triblock copolymer of styrene and a specific diene, where the two end-blocks are polystyrene and the internal block(s) are polydiene or hydrogenated polydiene, urethane thermoplastic elastomers having urethane chemical linkages in the hard blocks and ether, ester or carbonate linkages or mixtures of them in the soft blocks, thermoplastic rubber vulcanizate consisting of a blend of thermoplastic materials and a conventional rubber in which the rubber has been crosslinked by the process of dynamic vulcanization during the blending and mixing step and mixtures of two or more of these. In particular, the styrene-based elastomers are the preferred ones, alongside thermoplastic polyurethane elastomers.

Styrenic diblock and triblock copolymers are preferred, the most used are the styrenic triblock copolymers known under a normalized nomenclature, as S(B)S, S(I)S, S(EB)S, S(EP)S, S(EEP)S, S(IB)S where S=Styrene, I=isoprene, B=butadiene, EB=ethylene-butylene, EP=ethylene-propylene, EEB=ethylene-ethylene-propylene, IS=isobutylene. The preparation of these block copolymers is well known by the man skilled in the art.

In this present disclosure, styrene block copolymers exhibiting a primary peak of tg (delta) in the temperature range from −10° C. to 50° C. are preferred with high vinyl S(EP)S and S(IB)S are particularly preferred.

Examples include: a blend made from TPE from Kanaka Belgium, sold under the catalogue number 103T and high viscosity Siloxane polymer from Wacker under the catalogue number Genioplast Gum material number 60048258. These were manufactured in a twin screw extruder, and then molded into plaques, before grinding into a powder. They could be ground directly from the extruder. The ratio of the TPE to Gum could be from 1% to 90% and the compound can be ground. In this case it was 20% Siloxane.

Two-Pack Systems

The composition of the present disclosure may be formed from a two-pack system in which two, or more separate intermediate compositions are combined to for the final composition.

The two pack system may, for example, include one liquid composition comprising a polyol (e.g. a di-, tri- or higher polyol comprising two, three, or more hydroxy groups, preferably two or more primary or secondary hydroxy groups) and another composition comprising an isocyanate (e.g. a poly-isocyanate comprising two or more isocyanate functional groups), which when combined react to form a polyurethane (PU). Suitable isocyanates include aromatic isocyanate, such as methylene diphenyl diisocyanate or phenylene diisocyanates. The curing reaction may be spontaneous or require initiation. A catalyst or other curing aid may be included to facilitate or initiate the curing reaction. The system (A) may only be curable on inclusion of an initiator, for example a catalyst or other curing aid. The system may comprise a pre-polymer which cured to form a polymeric matrix, e.g. on exposure to heart or actinic radiation or when combined with a curing aid or initiator. The system may comprise reactive monomers or oligomers, e.g. comprising cationically curable groups, such as epoxides, or radical curable groups, such as ethylenically unsaturated groups e.g. vinyl or (meth)acrylate groups. Liquid-castable polymer systems of the type described herein are well known in the art and are commonly used for cast molding protective items for incorporation into clothing.

Preparation of the Shear Thickening Additive (Part B)

The materials of part B, (1) (2) and (3) were available in various forms, either as granules or sample plaques. These were placed into a grinding mill as used for regrinds with a fine filter, and then a hammer mill or blender. For these experiments parts B were prepared to be between 0.05 mm (D10) and 0.90 mm (D90), and sieved through a sieve of 0.95 diameter, to remove any larger particles. Particle size was measured on a high power USB microscope, and fund to be 0.9 mm diameter or less A good range of sizes from 0.05 to 0.9 mm helps with higher packing percentages.

Adding pure X3180 in high quantities to part A system has proved difficult, as it 're-healed'. In this example the X3180, was then compounded with 103T (TPE from Kaneka Belgium) at a ratio of 90% X3180 dilatant as a master batch, in a twin screw extruder. These were then prepared using the same method to a diameter of 0.9 mm diameter or less.

Tooling

Two low pressure tools were prepared for casing. The first is 5 mm thick solid cast sheets (90 mm×90 mm).

The second was design of a glove (1) as shown in FIG. 1. These have separate protection over the metacarpophalangeal joints (MCP) joints and proximal interphalangeal joints (PIP). The glove (1) includes the material of the present disclosure as energy absorbing elements (2a, 2b, 2c, 3a, 3b, 3c, 3d, 3e) incorporated onto the surface (4) of a textile glove (1). The section across A-A shows the re-entrant or undercut pins. Test were completed on the 2nd and 3rd MCP parts.

Casing Method

Additives of Part B were then prepared at different loading weights, samples were pre measured and prepared for 10%, 20%, and 30% additions by mass. These were added to each component of Polyeck Poly PT flex 50 and stirred for 5 minutes separately and then each component mixed together for a further 2 minutes. Left to sand for 1 min to remove and air and then poured into the tools. Textile was added to the glove tools. Samples were left to cure for 20 minutes at 150° C., and then left to cool to room temperature before removal.

Adding pure X3180 in high quantities to part A system has proved difficult, in this example the X3180 has already been mixed with 103T (TPE from Kaneka Belgium) at a ratio of 90% X3180 dilatant as a master batch. The Master batch was prepared in a twin screw extruder. This is easily ground into a power.

Test Method

Test Method uses a drop striker had a mass of 2.5 kg (BS EN 13594:2015), Load and speed at impact data were recorded at 50 kHz using a National Instruments acquisition system. System recorded peak acceleration and transmitted force (Raw) and digitally filtered in accordance with standard BS EN 1621-1:2012. Tests were completed at 22° C., approx. 200 mm drop height. This method has been presented at IRCOBI in 2016 for hand protection.

Transmitted force. (BS EN 13594:2015). Level 1 Motorcycle would need a transmitted force below 7 kN, and level 2 requires a reduction to 5 KN.

RESULTS

The results can be seen in Table 1. The results show the improved benefit in impact performance with the additives without stiffening up the samples.

TABLE 1

| | | Part B % by weight | | | |
|---|---|---|---|---|---|
| | | 0% | 10% | 20% | 30% |
| | | Transmitted Force in Newton's | | | |
| Additive | Tool Format | BS EN 13594:2015 | | | |
| 1) Dilatant | 5 mm Sheet | 7236 | 5127 | 5073 | 4603 |
| 1) Dilatant | Glove | 7374 | 6238 | 4759 | 5770 |
| 2) Master Batch | 5 mm Sheet | 7236 | 4466 | 4501 | 5026 |
| 2) Master Batch | Glove | 7374 | 5433 | 4703 | 4659 |
| 3) TPE/Si | 5 mm Sheet | 7236 | 5570 | 6189 | 5632 |

The standard Part A resin system does not pass the BS EN 13594:2015 (motorcycle test) in sheet form at 5 mm. With the addition of textile and geometry the standard system again fails to pass BS EN 13594:2015.

As can be seen from the results in table 1, the performance improvement is can be seen to be novel. In the case of the X3180 grades it is larger than one would predict from the sum of mixtures. 10% addition by weight give a 29% improvement. The improvement increases up to 36% at 30% loading by weight The significance of this is that a level 2 glove would need to be below 5 kn transmitted force, and an estimated 23% X3180 could be added to give this performance level, without increasing thickness or stiffness.

MB50 Additive is a cost effective method of improving performance of the slabs, and at only 10% additive 38% improvement is seen in sheet form. Less in seen in complex shapes with the addition of textile in the glove tool, but at 20% the gloves would pass level 2, again with no increase in stiffness.

What is claimed is:

1. A composition for use in forming an energy absorbing material, the composition comprising:
    a liquid-castable polymer system, which is configured to solidify to form a material comprising an elastomeric polymer matrix, the material comprising the elastomeric polymer matrix having a Shore D hardness in a range of 30 to 60; and
    a shear thickening additive, the shear thickening additive comprising particles having a D10 of at least 0.05 mm and a D90 of 2 mm or less and a Shore D hardness of at least 30,
    wherein the shear thickening additive is a blend comprising a thermoplastic elastomer and a silicone polymer.

2. The composition of claim 1, wherein the composition is:
    a liquid at 25° C., and
    is configured to solidify to form a solid material on curing.

3. The composition of claim 1, wherein the liquid-castable polymer system comprises a polyol and an isocyanate.

4. The composition of claim 1, wherein the composition comprises a polymerization initiator that initiates curing of the liquid-castable polymer system on exposure to heat or radiation.

5. An energy absorbing material comprising: a solid elastomeric polymer and a shear thickening additive, wherein the shear thickening additive is in a form of solid particles having a D10 of at least 0.05 mm and a D90 of 2 mm or less, wherein the material has a Shore D hardness of 30 to 60, wherein the shear thickening additive is a blend comprising a thermoplastic elastomer and a silicone polymer.

6. The energy absorbing material of claim 5, wherein the solid elastomeric polymer is a polyurethane.

7. The energy absorbing material of claim 5, wherein the solid particles have a maximum number average dimension (D50) of less than 1 mm.

8. The energy absorbing material of claim 5, wherein the material comprises 10 to 50 wt % of the shear thickening additive.

9. The energy absorbing material of claim 5, wherein the material comprises 45 to 90% by weight of the solid elastomeric polymer.

10. A method of preparing a composition for use in forming an energy absorbing material of claim 1, comprising incorporating the shear thickening additive into the liquid-castable polymer system prior to solidification of the liquid-castable polymer system.

11. The method of claim 10, wherein the liquid-castable polymer system is prepared by combining at least two components.

12. The method of claim 11, wherein the shear thickening additive is mixed into one or both of the at least two components of the liquid-castable polymer system prior to the at least two components being combined.

13. The method of claim 10, wherein incorporating the shear thickening additive into the liquid-castable polymer system comprises incorporating a composition comprising a curing initiator and the shear thickening additive into the liquid-castable polymer system.

14. The method of claim 10, further comprising placing the composition in a mold and solidifying the composition.

15. The method of claim 14, wherein the solidifying comprises a crosslinking reaction or a polymerization reaction, optionally initiated with heat or actinic radiation.

16. The method of claim 14, further comprising curing the composition at a pressure of 50 to 200 kPa, wherein curing is carried out in an open mold.

17. The method of claim 14, wherein the composition is in contact with a textile substrate during the solidifying.

18. The method of claim 14, the method further comprising curing the composition to produce an article comprising the energy absorbing material and the textile substrate, wherein the energy absorbing material is directly bound to the textile substrate.

19. The method of claim 18, wherein the energy absorbing material is directly bound to the textile substrate without an adhesive.

20. A method of preparing a material, comprising placing a composition in a mold and solidifying the composition to form the material, wherein the composition comprises:
  an elastomeric polymer, and
  a shear thickening additive in a form of solid particles having a D10 of at least 0.05 mm and a D90 of 2 mm or less,
  wherein the material has a Shore D hardness of 30 to 60,
  wherein the shear thickening additive is a blend comprising a thermoplastic elastomer and a silicone polymer.

21. An article, comprising:
  a substrate; and
  an energy absorbing material comprising: a solid elastomeric polymer and a shear thickening additive, wherein the shear thickening additive is in a form of solid particles having a D10 of at least 0.05 mm and a D90 of 2 mm or less, wherein the material has a Shore D hardness of 30 to 60,
  wherein the shear thickening additive is a blend comprising a thermoplastic elastomer and a silicone polymer.

22. The article of claim 21, wherein the substrate is a textile substrate, wherein the material is on a surface of the textile and/or distributed through or into the textile.

23. The article of claim 21, wherein the material is directly bound to the substrate.

24. The article of claim 23, wherein the material is directly bound to the substrate in an absence of an adhesive.

25. The article of claim 21, wherein the article is an article of protective clothing that protects a wearer from impact.

\* \* \* \* \*